United States Patent [19]

Lewis et al.

[11] 4,059,616

[45] Nov. 22, 1977

[54] NOVEL METHACRYLIC POLYMERS HAVING ALLYL FUNCTIONALITY

[75] Inventors: Sheldon N. Lewis, Willow Grove; Richard A. Haggard, Fort Washington, both of Pa.

[73] Assignee: Rohm and Haas Company, Philadelphia, Pa.

[21] Appl. No.: 517,334

[22] Filed: Oct. 23, 1974

Related U.S. Application Data

[63] Continuation-in-part of Ser. No. 371,921, June 20, 1973, abandoned, which is a continuation-in-part of Ser. No. 137,057, April 23, 1971, abandoned.

[51] Int. Cl.$^2$ ............................................. C07G 69/54
[52] U.S. Cl. ..................................... 526/66; 526/210; 526/328; 526/328.5; 560/180; 560/182
[58] Field of Search ..................................... 260/486 R

[56] References Cited

U.S. PATENT DOCUMENTS 3,317,483   5/1967   Verdol ............................. 260/486 R

FOREIGN PATENT DOCUMENTS 1,054,018   1/1967   United Kingdom ............ 260/486 R

OTHER PUBLICATIONS

Shimomura et al., *Kogyo Kagaku Zasshi*, 1968, 71/7, pp. 1070–1074.
Trekoval et al., *Cemicky Prumysl*, vol. 18(6), p. 312, (1968).
Trekoval et al., Journal of Polymer Science, part C, vol. 4, p. 333 (1963).

*Primary Examiner*—Paul J. Killos
*Attorney, Agent, or Firm*—Harold L. Greenwald; William E. Lambert, III

[57] ABSTRACT

Polymers of esters of methacrylic acid having an average chain length of about 6 to about 50 mers are prepared by an anionic polymerization reaction, carried out in the presence of a chain-regulating alcohol and a catalytic amount of an alkoxide anion, in which control of the molecular weight and molecular weight distribution of the polymer are achieved by regulating the ratio of the total quantity of alcohol employed to the total monomer charge. These polymers, their hydrolysis products, and their derivatives having allyl functionality have a wide variety of applications, including use as components in films, coatings, fibers, impregnants, adhesives, printing inks, and binders, and use as modifiers, plasticizers, melt flow improvers, and leveling agents.

8 Claims, No Drawings

NOVEL METHACRYLIC POLYMERS HAVING ALLYL FUNCTIONALITY

CROSS-REFERENCE TO RELATED APPLICATION

This application is a continuation-in-part of our pending application U.S. Ser. No. 371,921, filed on June 20, 1973, which is a continuation-in-part of our pending application U.S. Ser. No. 137,057, filed on Apr. 23, 1971 both now abandoned.

This invention relates to novel homopolymers and copolymers of esters of methacrylic acid having allyl functionality, to polymer compositions which comprise these novel polymers, to methods of making the polymers, and to uses of the polymers.

Polymers having relatively low molecular weights, often referred to as oligomers, have recently become of increasing interest, in part due to their use in adhesives, plasticizers, leveling agents, and melt-index improvers, and in formulating coating compositions having very high solids content. While various alkyds, polyesters, polyethers, polyamides, and polyurethanes having molecular weights in the range of 500 to 2500 can be conveniently prepared, suitable acrylic polymers in this molecular weight range have heretofore been inaccessible. Because acrylic polymers have many extremely valuable advantages, including relatively low cost, low color, good outdoor durability, high chemical resistance, and good thermal stability, and because the various non-acrylic low molecular weight polymers with functionalities greater than two are often difficult to prepare, polymer compositions comprising low molecular weight acrylic polymers would be particularly desirable.

Attempts have been made to prepare acrylic polymers having molecular weight distributions in the range of 2500 to 10000 by free radical polymerization techniques. However, these procedures are generally unacceptable, either because high temperature or high pressures are needed to carry out the polymerization reaction, because the chain transfer agent employed in the reaction has an objectionable odor or toxicity, or because the properties of the polymer produced in the polymerization reaction are adversely affected by a high incidence of initiator or chain transfer fragments in the polymer chains. Furthermore, it is difficult to control the molecular weight distribution of polymers prepared by free radical techniques. Thus, such polymers tend to have a broad molecular weight distribution and contain significant amounts of high molecular weight polymer, which can give unattractive properties to the polymer compositions. It has now been found that novel polymer compositions free of the undesirable properties of prior art materials can be prepared by a novel anionic polymerization technique, which allows control of the polymer chain length and of the molecular weight distribution of the polymer.

According to the invention, novel polymer compositions are provided which comprise an anionically-polymerized addition homopolymer of an ester of methacrylic acid having allyl functionality with at least one other copolymerizable monomer. In the polymer compositions of the invention, the homopolymer or copolymer has an average chain length of about 6 to about 50 mers. In one preferred embodiment, the average chain length will be about 6 to about 25 mers, and in another preferred embodiment, the average chain length will be about 8 to about 20 mers.

The polymers of the invention are characterized by having not only low molecular weight but also very narrow molecular weight distribution. Generally, at least about 85% by weight of the molecules of the homopolymer or copolymer in the polymer compositions have chain lengths falling between $\sqrt{2\bar{n}}$ and $2\bar{n}$, where $\bar{n}$ is the average chain length of the polymer. Thus, when the average chain length of the homopolymer or copolymer is about 6 mers, at least about 85% by weight of the molecules of the homopolymer or copolymer generally have chain lengths of about 3 to 12 mers, and when the average chain length of the homopolymer or copolymer is about 25 mers, at least about 85% by weight of the molecules of the homopolymer or copolymer generally have chain lengths of about 7 to about 50 mers. In a preferred embodiment of the invention, at least about 85% by weight of the molecules of the homopolymer or copolymer in the polymer compositions will have a chain length of about 4 to 40 mers. Depending upon the particular ester of methacrylic acid which is employed and the particular comonomer which may be employed, the polymer compositions of the invention will have a molecular weight distribution (weight average molecular weight, $\overline{M}w$) in the range of about 400 to about 10,000, and preferably about 500 to about 2500. The dispersities (ratio of weight average molecular weight to number average molecular weight) of the polymer compositions of the invention are also quite low, generally being about 1.1 to about 3, preferably less than about 2, and most preferably less than about 1.5.

The polymers of the invention comprise mers having the structure

wherein Z is an alkenyl group, preferably having 2 to 4 carbon atoms, and most preferably an allyl group, or an allyloxyalkyl group, preferably having up to 12 carbon atoms.

If the polymers contain less than 100% of the allyl-functional mers as defined above, they will generally also comprise mers of the structure

wherein Z' is an alkyl group, preferably having 1 to 24 carbon atoms.

Generally, the polymers of the invention have about 5 to about 100 mole percent allyl functionality. In a preferred embodiment, the polymers have about 10 to about 70 mole percent allyl functionality.

The polymer compositions of the invention or their precursors are produced by the anionic homopolymerization of an ester of methacrylic acid, or by the anionic copolymerization of an ester of methacrylic acid with at least one other copolymerizable monomer, thus producing, in the polymer, mers derivable from other alkoxide copolymerizable monomers. The anionic polymerization reaction is carried out in the presence of an alkoxide anion, which serves as a catalyst, and an alcohol, which serves as a chain-regulating agent. The polymers which are used as precursors in making the polymers of the invention are described and claimed in our U.S. patent application Ser. No. 517,336, entitled "Novel Polymers of Alkyl Methacrylates," filed on even date herewith, assigned to a common assignee, and incorporated herein by reference.

In general, most of the homopolymers of the polymer compositions of the invention can be represented by the following formula:

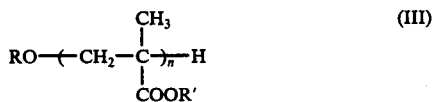

(III)

where
RO represents the residue of the chain-regulating alcohol used in the polymerization reaction,
R'O represents the alcohol portion of the monomeric ester of methacrylic acid, and
$n$ is an integer of 3 to 90, preferably 4 to 40, most preferably 5 to 25, and represents the chain length of the polymer.

The copolymers of the polymer compositions of the invention can be similarly represented, in general, by the following formula:

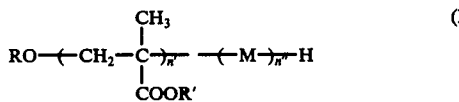

(IV)

wherein
RO and R'O are as defined above,
M represents the residue of the comonomer or comonomers, and
$n'$ and $n''$ and integers of one or more, wherein the sum of $n'$ and $n''$ is 3 to 90, preferably 4 to 40, and most preferably 5 to 25.

It should be noted that the copolymers represented by Formula IV represent polymers of two or more monomers and are random copolymers, so that Formula IV is only a simplified representation of the composition of these copolymers and does not attempt to show their physical stereochemical structure. Furthermore, it should be noted that when RO differs from R'O in Formulas III and IV, scrambling of these groups by transesterification occurs to some extent during the polymerization reaction. Thus, in some of the homopolymers represented by Formula III and copolymers represented by Formula IV, RO will be replaced at some positions by R'O, and R'O will be replaced at some positions by RO.

A wide variety of esters of methacrylic acid can be used in preparing the polymers of the invention and their precursors. Mixtures of these esters can also be used. Among the suitable esters which can be used are those having the formula:

(V)

wherein R" is an alkyl group, preferably having 1 to 24 carbon atoms, most preferably 1 to 18 carbon atoms; an alkenyl group, preferably having 2 to 4 carbon atoms; an allyloxyalkyl group, preferably having 2 to 12 carbon atoms; an aralkyl group, preferably having up to 10 carbon atoms; or an alkyl or aralkyl group having substituents which will not interfere with the anionic polymerization of the ester.

In a preferred embodiment of the invention, R", whether substituted or unsubstituted, will have a total of up to 6 carbon atoms.

Among the esters embraced by Formula V are alkyl methacrylates, in which the alkyl group can have branched- or straight-chain, cyclic or acylic spatial configurations, such as methyl methacrylate, ethyl methacrylate, propyl and cyclopropyl methacrylates, butyl and cyclobutyl methacrylates, pentyl and cyclopentyl methacrylates, hexyl and cyclohexyl methacrylates, heptyl and cycloheptyl methacrylates, octyl methacrylates, nonyl methacrylates, decyl methacrylates, undecyl methacrylates, lauryl methacrylates, myristyl methacrylates, cetyl methacrylates, stearyl methacrylates, and the like, aralkyl methacrylates, such as phenylethyl methacrylates, phenylpropyl methacrylates, and the like, and aralkyl methacrylates, in which the aryl group is substituted with alkyl groups, halogen atoms, alkoxy groups, nitro groups, or similar substituents which will not interfere with the polymerization reaction, alkenyl methacrylates, such as allyl methacrylate, and the like, and allyloxyalkyl methacrylates, such as allyloxyethyl methacrylate, allyloxyethoxyethyl methacrylate, allyloxypropyl methacrylate, and the like. Bis methacrylate esters of diols, such as the diester of 1,4-butanediol and methacrylic acid, can also be used. Other esters of methacrylic acid which do not contain substitutents which would interfere with the anionic polymerization of these esters can also be used. Of course, M in Formula IV can also represent an ester of methacrylic acid, and Formula IV embraces copolymers in which two or more esters of methacrylic acid, with or without additional comonomers, are polymerized according to the process of the invention.

As noted above, the polymer compositions of the invention or their precursors are produced by the anionic polymerization of the suitable monomer or monomers in the presence of an alcohol and an alkoxide catalyst. The final average molecular weight of the polymers produced in the anionic polymerization is a direct function of the overall molar ratio of the alcohol to the monomer. It has been found that two general approaches can be taken to obtain control of polymer molecular weight and molecular weight distribution to produce the polymer compositions of the invention.

In the first approach, which is a one-stage polymerization reaction, the molar ratio of the chain-regulating alcohol to the total monomer charge is maintained at a relatively constant value by addition of the alcohol throughout the polymerization reaction. Generally, it has been found that higher alcohol to monomer ratios will lead to slower polymerization rates and lower average molecular weight polymer compositions, while lower alcohol to monomer ratios will lead to faster polymerization rates and higher average molecular weight polymer compositions. Thus, by manipulating the molar ratio of the total quantity of the alcohol to the total monomer charge, some control of the molecular weight distribution of the polymer compositions of the invention can be obtained. Generally, the molar ratio of the alcohol to the total monomer charge will be from about 1:4 to about 1:50, and preferably from about 1:4 to about 1.25.

Either a batch or a gradual addition process can be employed to obtain the desired alcohol to monomer ratio. In the batch process, alcohol is added, at a rate consistent with the conversion of monomer to polymer, to a suspension or solution of the alkoxide catalyst in a solution of a portion of the total alcohol charge in the entire monomer charge. Generally, in the batch process, the concentration of the alcohol in the reaction mixture is kept relatively constant at about 0.05 to about 5 molar % of the total monomer charge, and preferably at about 0.1 to about 3 molar % of the total monomer charge. In the gradual addition process, both the monomer and the alcohol are gradually added to a suspension or solution of the alkoxide in an inert solvent or in a portion of the total monomer charge. The alcohol and the monomer can be gradually added to the polymerization separately or a solution of the alcohol in the monomer can be added. Generally, in the gradual addition process, the alcohol will be present at a level of about 2 to about 40 molar % of the total monomer charge, and preferably about 5 to about 25 molar % of the total monomer charge. At the conclusion of the addition of the alcohol or of the monomer and alcohol and a short holding period for polymerization to be completed, the alkoxide catalyst is neutralized with a suitable acid, such as a mineral acid or a carboxylic acid, as for example, acetic acid, and the resultant salt is removed by filtration or washed from the reaction mixture with water. If a solvent is present, it can be removed by conventional techniques, such as evaporation or distillation under reduced pressure or extrusion.

In the second, and preferred, approach to making the polymer compositions of the invention, the polymers are produced in a two-stage procedure. As in the previous approach, the final average molecular weight is determined by the final average molecular weight is determined by the final ratio of total monomer to alcohol, but a narrower distribution about the average molecular weight can usually be achieved. In the first stage of the polymerization reaction, a polymer having a low molecular weight distribution, for example in which $n$ in Formula III is about 2 to 6, with an average of 3 to 4, is prepared by the batch or gradual addition techniques described above, using about 20 to about 60% by weight of the total monomer charge, and using a relatively high alcohol concentration, generally about 20 to about 50 mole % of the initial monomer charge. The remainder of the monomer charge, generally about 40 to about 80% by weight of the total monomer charge, is then added to the reaction mixture. The addition of the remaining monomer is exothermic and leads to a revised molecular weight distribution. This final average molecular weight distribution is determined by the molar ratio of the alcohol to the total monomer charge. The resulting polymer composition can then be worked up and purified as described above.

The rate of polymerization is influenced by many reaction variables, including the type and concentration of catalyst, the reaction temperature, the relative acidity of the chain-regulating alcohol, and particularly by the concentration of the chain-regulating alcohol in the reaction mixture at any given time.

The above polymerization reactions are generally run at a temperature of about 40° to about 130° C., and preferably about 60° to about 95° C. Since the polymerization reaction in these processes is exothermic, temperature control generally is maintained either by reflux or by external cooling. Although no solvent is necessary to carry out these polymerization reactions, a suitable organic solvent which is inert under the reaction conditions, such as toluene, xylene, or the like, can be employed. It may be particularly advantageous under some polymerization conditions to employ a solvent, for example, at about 10 to 20% by weight, in the later stages of the polymerization to maintain a viscosity which is more convenient for handling. The polymerization reaction is generally conducted at atmospheric pressure, although super- or sub-atmospheric pressures may be advantageous under some conditions.

The polymerizations of the invention are catalyzed by alkoxides. A wide variety of alkoxides can be used in the polymerizations of the invention, and generally any alkoxide derived from an alcohol having the formula R″OH, where R″ is as defined in Formula V above, can be used. Mainly for economic reasons, simple normal alkoxides such as those of potassium and sodium, and particularly sodium methoxide and potassium methoxide are preferred as catalysts. Mixtures of alkoxides can also be used. However, by suitable choice of alkoxide, the rate of polymerization can be influenced greatly. The solubility of the alkoxide and the counter ion are factors which must be considered in assessing this influence. A polar organic cosolvent, such as, for example, dimethylformamide or dimethylsulfoxide, can also be used advantageously under some reaction conditions to improve the solubility and consequently the efficiency of the catalyst. Generally, the alkoxide will be present in the reaction mixture at a concentration of about 0.4 to about 4 mole %, and preferably about 0.6 to about 3.0 mole %, based on the total monomer charge.

A wide variety of alcohols can also be used as the chain-regulating agent in the polymerizations of the invention. Generally, the alcohol will have the formula R″OH, where R″ is as defined in Formula V above. However, the alcohol used in the polymerizations need not be identical to the alcohols from which the monomer or monomers are derived. For example, functional alcohols can be conveniently used to impart functionality to the ultimate polymer through transesterification. In addition, mixtures of alcohols can be used.

One of the advantages of the polymerization processes of the invention is their minimization of very low molecular weight material, as well as high molecular weight material, in the polymer compositions of the invention. The very low molecular weight material, such as dimers and trimers, detracts from the useful characteristics of the polymer compositions. Not only does the very low molecular weight material represent a diversion of monomer from forming useful polymer, this material can react with intended coreactants in use formulations. Furthermore, when present in plasticizer compositions, low molecular weight polymers lead to volatility problems. Thus, the polymer compositions of the invention are quite useful in applications where significant concentrations of very low molecular weight polymers are to be avoided.

Allyl functionality can be introduced into the polymers of the invention by using a monomer having allyl functionality, such as allyl methacrylate, allyloxyethyl methacrylate, or the like, by carrying out the polymerization reaction in the presence of an alcohol having unsaturation, such as allyl alcohol, allyloxyethanol, or the like, or by post-reacting a polymer of the invention by transesterification with an alcohol having unsaturation, These polymers which contain allyl functionality can be cured by conventional thermal means or by actinic, ultra-violet, or electron beam radiation, in the presence of a suitable initiator, such as benzoin methyl ether, diphenyldisulfide, benzophenone, triphenylphosphine, or the like. The radiation curable coatings are especially adaptable for formulating fast-drying printing inks, wood coatings, can coatings, and the like.

Among the preferred polymers of the invention having allyl functionality are homopolymers of allyl methacrylate and copolymers of allyl methacrylate with ($C_1$–$C_4$) alkyl methacrylates, prepared by the procedures of Example 1, and having a weight average molecular weight of about 600 to about 2000. For example, they are quite useful in forming films, coatings, such as in paints, lacquers, varnishes, and the like, powder coatings, impregnants, and adhesives for both natural and synthetic materials, such as paper, textiles, wood, brick, stone, ceramics, plastics, metal, and leather, as binders for non-woven fabrics, as plasticizers and modifiers for a wide variety of polymer compositions, as melting point depressants, as leveling agents and coalescent aids, and in a wide variety of other uses. Pigments, dyes, fillers, antioxidants, antiozodants, stabilizers, flow control agents, or other optional ingredients can also be included in polymer compositions of the invention.

When used as coatings, fillers, or adhesives, the polymer compositions of the invention can be applied with or without a solvent by casting permanently or removably onto a suitable substrate. However, one of the advantages of the present invention is that reactive polymers can be prepared which can be applied without the use of any solvents, in either solid or liquid form as 100% solids compositions, or with a solvent in high solids compositions having less than 100% solids. For example, when water or an organic solvent is used, the reactive polymers are advantageously formulated at about 50 to about 100% by weight solids, and preferably greater than about 70% by weight solids. These properties are particularly desirable since minimization or elimination of volatile organic solvents also minimizes or eliminates potential ecological hazards. Among the organic solvents which can be used to formulate polymers of the invention and reactive polymer systems incorporating these polymers are hydrocarbons such as benzene, toluene, xylenes, and aromatic naphthas or mixtures of such solvents; esters such as ethyl, butyl, amyl, ethoxyethyl, or methoxyethyl acetates, lactates, or propionates, ketones such as acetone, methyl isopropyl ketone, methyl isobutyl ketone, dioxane, isophorone, and cyclohexanone; alcohols such as n-butanol, t-butanol, isopropyl alcohol, n-propyl alcohol, amyl alcohols, and cyclohexanol; ethers, such as diethyl ether, the monoethyl ether of ethylene glycol, the monomethyl ether of ethylene glycol, and the monobutyl ether of ethylene glycol; and miscellaneous solvents including dimethylformamide, dimethylacetamide, acetonitrile, nitromethane, nitroethane, nitropropane, and nitrobutane; as well as mixtures of two or more solvent materials listed above.

The following examples will further illustrate the invention but are not intended to limit it in any way. All parts are by weight and all temperatures are in degrees Centigrade, unless otherwise noted. Example 1 shows three typical polymerization processes used to make the polymers of the invention as well as their nonfunctional precursors. Examples 2 to 20 show typical polymers used as precursors. Examples 21 and 22 show typical polymers of the invention made by processes similar to those shown in Example 1.

EXAMPLE 1

Homopolymerization of Methyl Methacrylate

Method A

This example shows a typical homopolymerization of an ester of methacrylic acid according to the "batch-type" polymerization process of the invention.

A clean, dry 3-neck flask equipped with mechanical stirrer, condenser and thermometer in a Y-arm side inlet, under dry nitrogen, is charged with commercially pure methyl methacrylate monomer, inhibited with 10 ppm of phenothiazine or dicyclohexyl phenylene diamine. The stirred solution is heated; upon warming to 60° C., it is charged with 0.6 mole % sodium methoxide and 3.0% methanol (added as a 25% by weight solution in methyl alcohol). The cloudy white mixture is heated to 93° C. over a 6-minute period, and as the 75°–80° C. temperature is passed, methanol addition in aromatic solvent (xylene, toluene) is started via the side arm inlet at the rate of 0.35 mole % per minute for a period of 33 minutes (to a total of 15 mole % methyl alcohol addition). The gradually thickening and clearing solution is maintained at 93° + 1° C. with stirring for an additional 2 hours. Xylene or toluene is added as diluent as needed for viscosity control. Analysis of the product solution by gas-liquid chromatography upon completion of the reaction time discloses less than 2% of residual methyl methacrylate and a trace (<0.1%) of methyl alcohol. Dimer and trimer levels are less than 3–4% and less than 8–10% by weight, respectively, as determined by quantitative gas-liquid chromatography and confirmed by gel permeation chromatography. The yellow to yellow-orange mixture is cooled to 60° C., the basic components are quenched with acid (for example, acetic, formic, HCl, $H_2SO_4$) removing essentially all color, and 1% by weight of a suitable filter aid is dispersed and stirred for 5–10 minutes. Pressure or aspirator filtration results in greater than 94% by weight recovery of a clear, colorless to light straw solution of methyl methacrylate polymer. Analysis by gel permeation chromatography shows symmetrical weight distribution around 700–900 M.W., with greater than 85% by weight in the range of 300–1200. Unsaturation determination with solvent-stripped product typically shows less than 0.07 meq./g.

Similar procedures with differing methanol addition rates at constant catalyst level and 93° C. give the product distribution in Table I.

TABLE I

| Methanol Addition Rate (Mole %/Min.) | Total Alcohol Level (Mole % of Methyl Methacrylate Charged) | Product Appearance and Molecular Weight Distribution[1] |
|---|---|---|
| 0.45 | 20 | Oil; 300 – 900 |
| 0.30 | 12 – 13 | Syrup[2]; ~400 – 1500 |
| 0.20 | 11 | Semi-Solid; 600 – 1600 |
| 0.10 | 8 – 9 | Brittle Solid M.P. >40° C.; 800 – 3000 |
| 0.05 | 7 | Brittle Solid M.P. ~50 – 80°; 1000 – 4000 |
| None | 3 | Brittle Solid M.P. ~50 – 80°; 1000 – 10000 |

[1]greater than 85% of the product weight contained in the limits specified; by gel permeation chromatography.
[2]At 80% by weight in solvent.

Method B

This example shows a typical homopolymerization of an ester of methacrylic acid according to a gradual addition polymerization process of the invention.

To the apparatus described in Method A is charged 1.0 to 1.2 mole % (based on monomer to be subsequently added) of powdered potassium tert-butoxide or methoxide to enough toluene or xylene diluent to form a stirrable slurry. A solution of methyl methacrylate containing 15 mole % methanol, neat or about 10% by weight of toluene or xylene for viscosity control, is added dropwise to the stirred catalyst slurry at 65° C., at a rate sufficient to maintain reaction (added at 1.3-1.5% per minute for the first half of addition and about 1.0% per minute for the second half). The mixture readily takes on a pale yellow color, and the viscosity noticeably increases after several percent of the monomer solution is added. Aliquots taken during and following monomer/alcohol addition establish that high conversion polymerization, with molecular weight distribution essentially constant, occurs throughout the addition period, that less than 10% residual monomer remains at the completion of addition. A short holding time at 65° C. reduces monomer levels to about 2%.

Following a 20 to 30 minute hold, the nearly clear, yellow oil is cooled to 60° C., quenched with 1.0–1.2% acetic acid (removing amost all color), treated with 1% by weight of a filter aid and vacuum or pressure filtered at 60° to 80° C. Gel permeation chromatography of the clear, colorless to light straw colored oil discloses the major weight fraction to be about 1200, with 90% by weight spread between 300 and 2600. Lower methanol levels yield successively higher molecular weight products of somewhat broader molecular weight distribution. (See Table II)

TABLE II

Methyl Methacrylate Polymerization,
Gradual Addition Process at 65° C.

| Methanol Level | Product $\overline{M}W$ (and 90 wt. % distribution) |
|---|---|
| 20% | 1100 – 1200 (300 – 2500) |
| 16 | 1200 (300 – 2600) |
| 12 | 1600 – 1700 (350 – 3500) |
| 10 | 1800 (350 – 4000) |

Method C

This example shows a typical homopolymerization of an ester of methacrylic acid according to the two-stage polymerization process of the invention.

To the apparatus described in Method A is charged 2.24 g. (20 mmole, 1.0 mole % based on total monomer) of powdered potassium tert-butoxide (or an equivalent molar charge of potassium methoxide) and about 10 g. xylene to form a stirrable slurry. Monomer solution (a) is prepared with 80 g. (0.80 mole, 40% of total monomer) methyl methacrylate, inhibited with 3 ppm dicyclohexyl phenylenediamine, and 9.6 g. (0.30 mole, 37.5 mole % of the initial methyl methacrylate charge, 15% of total monomer charge) anhydrous methanol; solution (a) is added over a 30 to 45 minute period to the stirred catalyst slurry at 60° to 65° C. The exotherm observed during the early stages of addition subsides, and reaction temperature is maintained throughout addition and for a 45 minute post-addition hold. The reaction mixture is a mobile, hazy orange-yellow liquid containing 5–10% of free methyl methacrylate and 90–95% as dimer through hexamer ($n = 2$–$6$).

Monomer solution (b), consisting of 120 g. (1.20 mole, 60% of total monomer charge) methyl methacrylate and 25 g. xylene, is added dropwise over a 1-hour period at 60°–65° C. Exotherm occurs throughout this addition; gas-liquid chromatography of reaction aliquots discloses monomer levels at less than 1%, and gel permeation chromatography indicates polymer growth paralleling addition. After the addition of solution (b), the hazy orange syrup (viscosity about 300 cps at 65°) is held at this temperature for 15 minutes, reducing methyl methacrylate level to essentially nil, and the catalyst is then quenched with 1.2 g. (20 mole) acetic acid. One gram of a filter aid is added to the nearly colorless syrup and dispersed with stirring for 5 to 10 minutes.

Vacuum or pressure filtration of the warm oil through warm funnel affords the product as a clear, light straw to colorless syrup in greater than 98% recovery. Gel permeation chromatography discloses $\overline{M}w$ approximately 720–750, with the distribution 300–1300.

When a total of 20 mole % methanol is used in the above procedure, polymer is obtained in greater than 95% yield with $\overline{M}w$ about 620, spread from 250 to 1100.

In general, potassium n-alkoxides are preferred catalysts. Preparations made solely with initially soluble sodium methoxide as the catalyst are also successful, but require approximately 4 to 5-fold longer reaction times for 95% conversion at 90°–93° C. Gel permeation chromatography discloses a similar $\overline{M}w$, at 750–800 with a slightly broader distribution, 300 to 1600. Mixtures of potassium and sodium alkoxides can be used as catalyst to optimize the polymerization efficiency under different reaction conditions.

While each of the above three methods can be used to prepare polymers of the invention, Method A and Method C are generally preferred since they yield polymeric products having narrower molecular weight distribution.

EXAMPLES 2 TO 22

Preparation of Methacrylate Homopolymers and Copolymers

Following the procedures of Example 1, a wide variety of methacrylate homopolymers and copolymers are prepared. Table III summarizes the polymerization conditions and properties of some typical methacrylate polymers of the invention.

TABLE III

Methacrylate Homo- and Co-Polymers

| Ex. | Monomer(s)[1] | Method[2] | Conversion[3] (Hours) | Alcohol Level[4] | | Product ($\overline{M}w$) | Chain Length[7] | |
|---|---|---|---|---|---|---|---|---|
| 2 | MMA | A (93°) | 97.3% (2.5) | 18% (0.35) | 700 | (300–1100)[6] | 6–7 | (3–11) |
| 3 | MMA | A (93°) | 97 (2.5) | 15 (0.3) | 750 | (300–1600)[6] (80%, 400–1300) | 7 | (3–16) |
| 4 | MMA | A (93°) | 97 (2.0) | 8 (0.1) | 1600 | (500–2500) | 16 | (5–25) |
| 5 | MMA | B (65°) | 96 (1.5)[8] | 12 | 1600 | (400–3300) (80%, 430–2500) | 16 | (4–33) |
| 6 | MMA | B (80°) | 96 | 16 | 1200 | (300–2400) | 12 | (3–24) |

TABLE III-continued

Methacrylate Homo- and Co-Polymers

| Ex. | Monomer(s)[1] | Method[2] | Conversion[3] (Hours) | Alcohol Level[4] | Product ($\bar{M}w$) | | Chain Length[7] | |
|---|---|---|---|---|---|---|---|---|
| 7 | MMA | B (100°) | >90 (5-6) (2)[8] | 15 | 1600 | (400-2500) | 16 | (4-25) |
| 8 | MMA | C (65°) | 99% (2)[8] | 15 | 750 | (300-1600) (80%, 430-1300) | 7-8 | (3-16) |
| 9 | MMA | C (65°) | 95 (ca. 4)[8] | 20 | 620 | | | |
| 10 | MMA | C (93°) | >90 (6)[9] | 15 | 800 | (300-1600)[6] | 7-8 | (3-16) |
| 11 | BMA | A (98°) | 95 (3) | 11 (0.2) | 1400 | (400-3200) | 10 | (3-23) |
| 12 | BMA | B (80°) | 96 (2.2)[8] | 12 | 2400 | (400-6000) | 16-17 | (3-40) |
| 13 | BMA | B (80°) | 96 (2.2)[8] | 15 | 1600 | (400-5800) | 11 | (4-40) |
| 14 | EMA | B (75°) | 96 (2.5)[8] | 15 | 1600 | (350-6500) (80%, 450-5200) | 14 | (3-60) |
| 15 | BMA | C (80°) | 99 (4)[8] | 15 | 1000 | (350-2200) | 6-7 | (3-15) |
| 16 | 80 MMA/20 BMA | A (93°) | 96 (2.5) | 15 (0.35) | 1000 | (350-1800)[6] | 9 | (3-16) |
| 17 | 50 MMA/50 BMA | A (93°) | 95 (3.0) | 11 (0.2) | 1100 | (400-2200) | 9-10 | (4-18) |
| 18 | 77 MMA/23 LMA | A (93°) | 95 (2) | 13 (0.3) | 1100 | (400-2500) | 8 | (2-18) |
| 19 | 68 MMA/32 t-BAEMA | B (80°) | 96 (3)[8] | 12 | est. 1800 | (400-3500) | est. 14 | (3-27) |
| 20 | 75 MMA/25 i-BMA | B (95°) | 80 (incomp. at 4) | 5 | 1400 | (400-3000) | 13 | (4-27) |
| 21 | 75 MMA/25 AOEMA | A (93°) | 95 (3) | 13 (0.2) | 1100 | (400-2500) | 9 | (3-21) |
| 22 | ALMA | C (60-65°) | 97 (4)[8] | 10 | 1200 | (550-2500) | 9.5 | (4 19) |

Additional Notes:
[1] The following abbreviations are used: MMA = methyl methacrylate; EMA = ethyl methacrylate; BMA = butyl methacrylate; LMA = lauryl methacrylate; AOEMA = allyloxyethyl methacrylate; i-BMA = isobutyl methacrylate; ALMA = allyl methacrylate.
[2] A = Method A in Example 1; B = Method B in Example 1; C = Method C in Example 1; reaction temperature in ° C. in parentheses.
[3] Conversion determined by residual monomer via gas-liquid chromatography; catalyst is 0.6 mole % NaOCH$_3$ in 3.0 mole % methanol, unless otherwise noted.
[4] Method B, mole % alcohol on monomer; Method A, total mole % alcohol on monomer (added at the indicated mole %/min.); Method C, on total monomer, added in first stage.
[5] Weight average molecular weight ($\bar{M}w$) as determined by standardized gel permeation chromatography, based on methyl methacrylate polymer calibration (> 90 wt. % included in the M.W. distribution listed parenthetically); 80% distribution given in several typical examples.
[6] The lower $\bar{M}w$ polymers (i.e., those of $\bar{M}w$ less than 1300) contain about 4-8% by weight of polymer molecules under M.W. 400.
[7] Determined as in footnote 5; represents n in Formula III or (n' + n'') in Formula IV.
[8] The catalyst is 1.0-1.5 mole % powdered potassium t-butoxide or methoxide.
[9] Sodium methoxide catalyst in methanol; reaction terminated before complete conversion.

EXAMPLE 23

Cure of Allyl-Functional Polymers with Actinic Radiation

This example shows a typical curing procedure for polymers of the invention.

Samples of the polymers of Examples 21 and 22 were irradiated under a 2400 watt, medium pressure mercury vapor source at a distance of 4 inches in the presence of 1 to 3 weight % of a suitable photo-initiator. Films are cast at a thickness of 2 mils. Of these formulations which are representative of the type used in fast-drying inks, the polymers become quickly tack-free upon irradiation. Similar fast cure is obtained with other polymers of the invention having allyl functionality. Other related thermal and radiation curing methods can also be used. These polymers are particularly useful when formulated as fast-drying printing inks, wood coatings, can coatings, and particle board fillers.

It is to be understood that changes and variations may be made without departing from the spirit and scope of the invention as defined by the appended claims.

We claim:

1. An alkoxide-polymerized addition homopolymer or copolymer of an ester of methacrylic acid wherein the polymer comprises mers having the formula

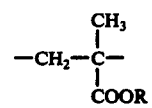

wherein R is a (C$_2$-C$_4$) alkenyl group, an allyloxyalkyl group having up to 12 carbon atoms, or an allyloxyalkoxyalkyl group having up to 12 carbon atoms, and, optionally, mers derivable from other anionically copolymerizable monomers, and wherein $\bar{n}$, the average chain length of the polymer is about 6 to 50 mers; the polmerization being carried out, in the presence of an alcohol and a catalytic amount of an alkoxide, using controlled rates of addition of at least one of the ester, the alcohol and the alkoxide.

2. The polymer of claim 1 wherein at least about 85% by weight of the molecules of the polymers have chain lengths of about $\sqrt{2\bar{n}}$ to about $2\bar{n}$ mers.

3. The polymer of claim 2 wherein the average chain length is about 6 to about 25 mers.

4. The polymer of claim 2 wherein R is an allyl group.

5. The polymer of claim 2 wherein R is an allyloxyethyl group.

6. The polymer of claim 2 wherein the polymer also comprises mers having the formula

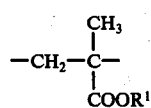

wherein $R^1$ is a $(C_1-C_{24})$ alkyl group.

7. The polymer of claim 6 wherein $R^1$ is a $(C_1-C_4)$ alkyl group.

8. The polymer of claim 6 represented by the formula:

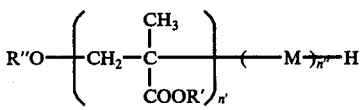

wherein
$R''O$ represents the residue of the chain-regulating alcohol used in the polymerization reaction;
$R'O$ represents the alcohol portion of an ester of methacrylic acid;
M represents the interspersed residue of the comonomer or comonomers; and
$n'$ and $n''$ are integers of one or more, wherein the sum of $n'$ and $n''$ is 3 to 90.

* * * * *

UNITED STATES PATENT AND TRADEMARK OFFICE
CERTIFICATE OF CORRECTION

PATENT NO. : 4,059,616
DATED : 11/22/77
INVENTOR(S) : SHELDON N. LEWIS and RICHARD A. HAGGARD It is certified that error appears in the above-identified patent and that said Letters Patent are hereby corrected as shown below:

Column 2, lines 65, 66 and 67, delete the following: ", thus producing, in the polymer, mers derivable from other alkoxide copolymerizable monomers".

Column 3, line 39, delete word "and" before "integers" and in lieu thereof insert the word -- are --.

Column 4, line 30, underline work "Bis".

Column 5, line 2, delete figure "1.25" and in lieu thereof insert figure -- 1:25 --.

Column 5, line 38, after word "final" delete words "average molecular weight is determined by the final".

Column 7, line 64, delete "Centrigrade" and in lieu thereof insert word -- Centigrade --.

Column 8, line 26, delete plus sign "+" between figures "93°" and "1°C." and insert therefor a plus-minus sign -- $\pm$ --.

UNITED STATES PATENT AND TRADEMARK OFFICE
CERTIFICATE OF CORRECTION

PATENT NO. : 4,059,616
DATED : 11/22/77
INVENTOR(S) : SHELDON N. LEWIS and RICHARD A. HAGGARD It is certified that error appears in the above-identified patent and that said Letters Patent are hereby corrected as shown below:

Column 9, line 39, Table II, delete capital "W" in heading and in lieu thereof insert small -- w --.

Column 10, lines 28 and 29, from words "recovery" to "approximately" should be reprinted in normal print NOT in bold face or dark print.

Column 12, line 54, delete word " polmerization " and, in lieu thereof, insert word -- polymerization --.

Signed and Sealed this

Fifteenth Day of May 1979

[SEAL]

Attest:

RUTH C. MASON
Attesting Officer

DONALD W. BANNER
Commissioner of Patents and Trademarks